(12) United States Patent
Rothstein et al.

(10) Patent No.: US 11,185,914 B2
(45) Date of Patent: Nov. 30, 2021

(54) METHOD FOR FORMING AN ASSEMBLY HAVING MATING SUPERFINISHED COMPONENTS

(71) Applicant: American Axle & Manufacturing, Inc., Detroit, MI (US)

(72) Inventors: Moshe Rothstein, Oak Park, MI (US); Cory J. Padfield, Royal Oak, MI (US); Toby V. Padfield, Livonia, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 44 days.

(21) Appl. No.: 16/799,933

(22) Filed: Feb. 25, 2020

(65) Prior Publication Data
US 2020/0188987 A1 Jun. 18, 2020

Related U.S. Application Data

(62) Division of application No. 15/846,280, filed on Dec. 19, 2017, now Pat. No. 10,618,102.

(51) Int. Cl.
| | |
|---|---|
| *F16H 55/06* | (2006.01) |
| *B23F 17/00* | (2006.01) |
| *B23F 5/10* | (2006.01) |
| *B21K 1/30* | (2006.01) |
| *F16H 48/38* | (2012.01) |
| *B60K 17/16* | (2006.01) |
| *B60K 17/28* | (2006.01) |
| *F16H 1/14* | (2006.01) |

(52) U.S. Cl.
CPC .............. *B21K 1/30* (2013.01); *B60K 17/165* (2013.01); *F16H 48/38* (2013.01); *F16H 55/06* (2013.01); *B23F 5/10* (2013.01); *B23F 17/001* (2013.01); *B60K 17/28* (2013.01); *F16H 1/14* (2013.01); *F16H 2048/382* (2013.01); *F16H 2048/385* (2013.01)

(58) Field of Classification Search
CPC .......... B23P 15/003; B23F 17/00; B23F 5/02; B23F 5/04; B23F 5/10; B23F 9/02; F16H 2048/382; F16H 2048/385; F16H 55/06
See application file for complete search history.

(56) References Cited

U.S. PATENT DOCUMENTS

| | | | |
|---|---|---|---|
| 3,618,272 | A | 11/1971 | Whalen et al. |
| 8,858,734 | B2 | 10/2014 | Michaud et al. |
| 9,032,597 | B2 | 5/2015 | Zhmud |
| 2003/0040264 | A1 | 2/2003 | Taniguchi et al. |

*Primary Examiner* — Christopher J Besler
(74) *Attorney, Agent, or Firm* — Burris Law, PLLC

(57) ABSTRACT

A method for forming an assembly having a housing and first and second components. The first and second components are movable relative to one another in the housing. The method includes: providing first and second workpieces; moving the first and second workpieces relative to one another in a predetermined manner that produces relative sliding contact between the first and second workpieces while performing a superfinishing operation on the first and second workpieces to form the first and second components, respectively, wherein the superfinishing operation does not comprise a lapping operation; and mounting the first and second components in the housing such that the first and second components are engaged to one another and are movable relative to one another in the predetermined manner.

4 Claims, 3 Drawing Sheets

METHOD FOR FORMING AN ASSEMBLY HAVING MATING SUPERFINISHED COMPONENTS

CROSS-REFERENCE TO RELATED APPLICATIONS

This application is a divisional application of U.S. application Ser. No. 15/846,280 filed Dec. 19, 2017, the disclosure of which is incorporated by reference as if fully set forth in detail herein.

FIELD

The present disclosure relates to a method for forming an assembly that has mating superfinished components.

BACKGROUND

This section provides background information related to the present disclosure which is not necessarily prior art.

There is a need in the art for a cost efficient method for improving the finish of the mating surfaces of components that movably engage one another in an assembly. For example, power losses through the hypoid gears of a modern automotive driveline component are significantly affected by the surface finish of the teeth of the hypoid gears. The teeth of such hypoid gears are commonly lapped together and as such, have a relatively low surface finish. In such gears, however, further improving the surface finish of the gears can significantly reduce surface friction so that the driveline component is able to operate more efficiently. Post-lapping processes, such as an Isotropic Superfinishing process, have been employed to obtain further reductions in the surface finish of hypoid gears, but such post-lapping processes tend to have relatively low throughput.

Accordingly, it would be desirable to avoid the use of a lapping process with a subsequent finishing operations to obtain a desired surface finish with a desired level or degree of conformity between the surfaces of the mating components.

SUMMARY

This section provides a general summary of the disclosure, and is not a comprehensive disclosure of its full scope or all of its features.

In one form, the present disclosure provides a method for forming an assembly having a housing and first and second components. The first and second components are movable relative to one another in the housing. The method includes: providing first and second workpieces; moving the first and second workpieces relative to one another in a predetermined manner while performing a superfinishing operation on the first and second workpieces to form the first and second components, respectively, wherein the superfinishing operation does not comprise a lapping operation; and mounting the first and second components in the housing such that the first and second components are engaged to one another and are movable relative to one another in the predetermined manner.

In another form, the present disclosure provides a method for forming an assembly having a housing and first and second components. The first and second components are movable relative to one another in the housing. The method includes: mounting a first workpiece for rotation about a first axis; mounting a second workpiece in meshing engagement with the first workpiece and for rotation about a second axis; rotating the first workpiece about the first axis to drive the second workpiece about the second axis; performing a superfinishing operation on the first and second workpieces while the second workpiece is being driven by the first workpiece to form the first and second components, respectively, wherein the superfinishing operation does not comprise a lapping operation; and mounting the first and second components in the housing such that the first and second components are meshingly engaged to one another and are rotatable relative to the housing about the first and second axes, respectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
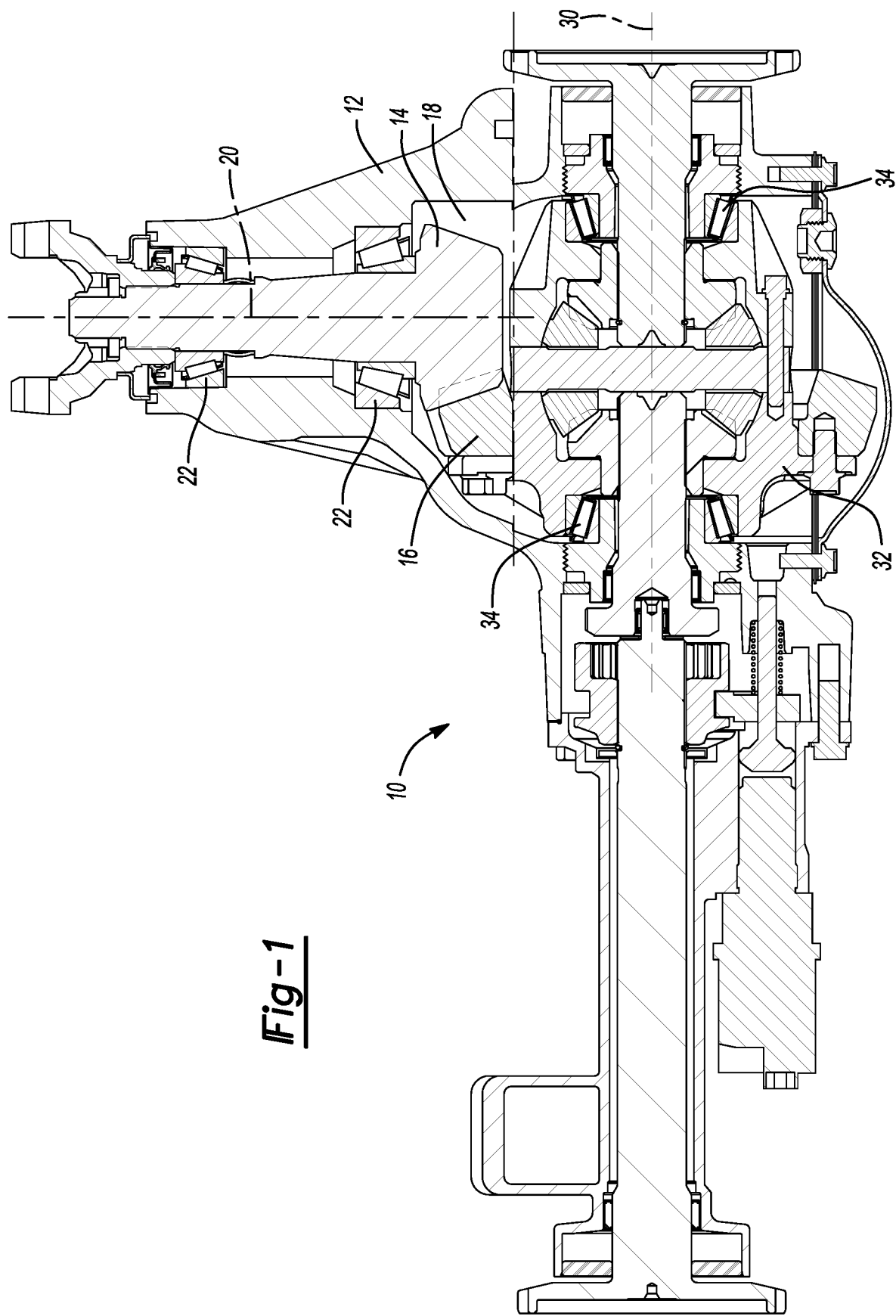
FIG. 1 is a sectional view of an exemplary assembly constructed in accordance with the teachings of the present disclosure.

With reference to FIG. 1, an exemplary assembly constructed in accordance with the teachings of the present disclosure is generally indicated by reference numeral 10. In the particular example provided, the assembly 10 is a an axle assembly, but it will be appreciated that the teachings of the present disclosure have application to other assemblies having a housing and two components that are movably engaged to one another and received in the housing, including other driveline components such as power take-off units.

The assembly 10 has a housing 12, an input pinon or first component 14 and a ring gear or second component 16. The housing 12 defines a cavity 18 into which the input pinion 14 and the ring gear 16 are received. The input pinion 14 is supported for rotation relative to the housing 12 about a first axis 20 by a pair of pinion bearings 22. The ring gear 16 can be supported for rotation relative to the housing 12 about a second axis 30 and can be meshingly engaged with the input pinion 14. In the example provided, the ring gear 16 is fixedly coupled to a differential case 32, and the differential case 32 is supported for rotation relative to the housing 12 about the second axis 30 by a pair of differential bearings 34. The input pinion 14 and the ring gear 16 can be spiral bevel gears, such as hypoid gears.

Figure 2:
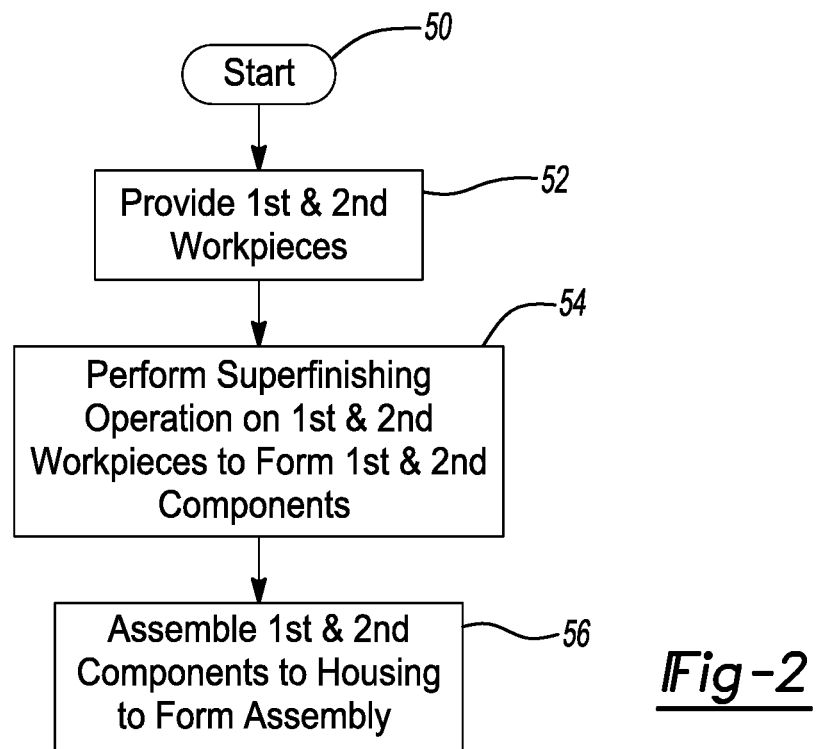
FIG. 2 is a schematic illustration in flowchart form of an exemplary method according to the teachings of the present disclosure.

With reference to FIG. 2, a method for forming the assembly 10 (FIG. 1) is illustrated. Briefly, the method entails the superfinishing of a pair of workpieces to form a pair of components, and the subsequent mounting of the components into a housing where the components are engaged to one another and are movable relative to one another in a predetermined manner.

Figure 3:
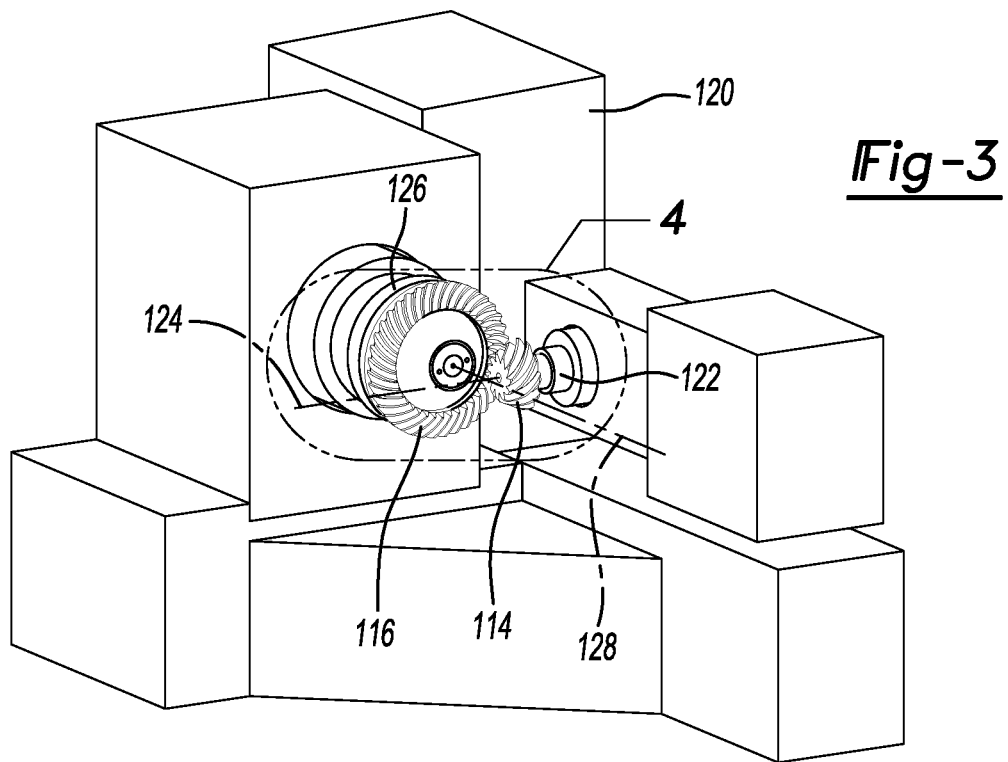
FIG. 3 is a perspective view of a machine for performing a portion of a method in accordance with the teachings of the present disclosure.
Figure 4:
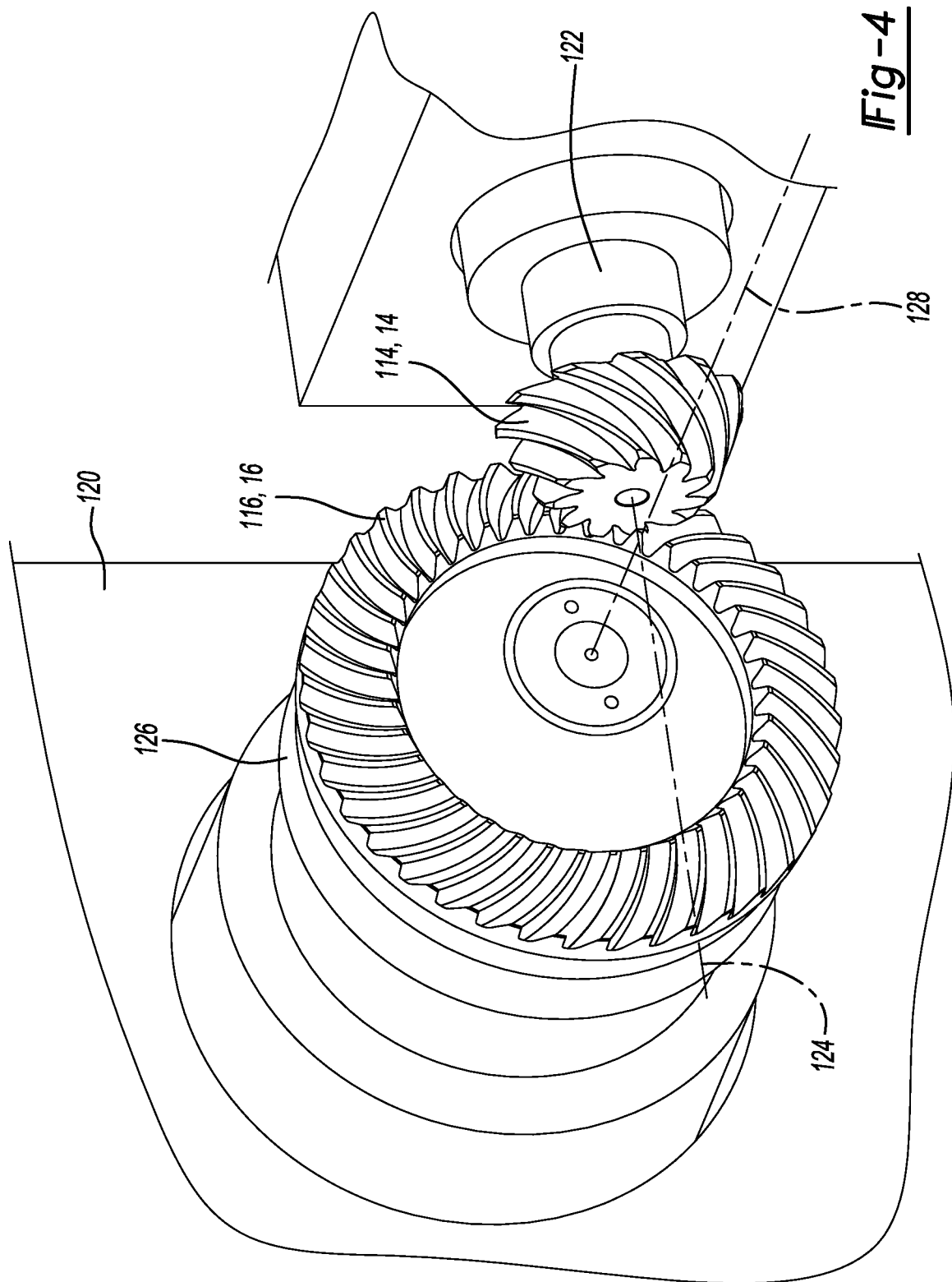
FIG. 4 is an enlarged portion of FIG. 3.

With reference to FIGS. 2 through 4, the method begins at bubble 50 and proceeds to block 52 where a first workpiece 114 and a second workpiece 116 are provided. In the example provided, the first workpiece 114 is a hypoid (spiral bevel) pinion gear having "unfinished" pinion gear teeth, while the second workpiece is a hypoid (spiral bevel) ring gear having "unfinished" ring gear teeth.

The method can proceed to block 54, where the first and second workpieces 114 and 116 are mounted into a superfinishing machine 120 and thereafter the superfinishing machine 120 is operated so that a superfinishing operation is performed on the first and second workpieces 114 and 116 while they move relative to one another and engage one another in a manner that produces relative sliding motion between the first and second workpieces 114 and 116. The superfinishing operation is configured to "finish" the engaging surfaces of the first and second workpieces 114 and 116 to thereby form "finished" surfaces on the first and second components 14 and 16 (FIG. 1). It will be appreciated that the superfinishing operation is configured to provide the mating surfaces of the first and second components 14 and 16 (FIG. 1) with a desired surface finish as well as a desired degree or level of conformity between the engaging surfaces. It will also be appreciated that other machining operations may be performed on the first component 14 (FIG. 1) and/or second component 16 (FIG. 1) on surfaces other than the engaging surfaces of the first and second components 14 and 16 (FIG. 1) after the completion of the superfinishing operation.

In the example provided, the superfinishing machine 120 can be generally similar to a lapping machine and the superfinishing operation is intended to "finish" the portions of the pinion and ring gear teeth that contact one another during operation of the assembly 10. The superfinishing machine 120 can include a first spindle 122, which is rotatable about a first machine axis 124, and a second spindle 126 that is rotatable about a second machine axis 128. The first and second machine axes 124 and 128 can be oriented relative to one another in a manner that is similar to the orientation of the first and second axes 20 and 30 (FIG. 1) in the assembly 10 (FIG. 1). The first workpiece 114 can be mounted to the first spindle 122 for rotation about the first machine axis 124. The second workpiece 116 can be mounted to the second spindle 126 for rotation about the second machine axis 128 and can be meshingly engaged with the first workpiece 114.

The superfinishing operation can be performed in various different ways. For example, the superfinishing operation can comprise chemical polishing, electro-polishing, chemically-accelerated surface finishing with tribochemical film deposition and combinations thereof.

Chemical polishing could employ the use of a non-abrasive fluid, such as a non-abrasive fluid employed in an isotropic superfinishing operation, on/between the first and second workpieces 114 and 116 as they are engaged to one another and moved relative to one another in a manner that produces relative sliding motion between the first and second workpieces 114 and 116. The fluid can interact with the material on the surfaces of the first and second workpieces 114 and 116 to create a conversion coating on the surfaces of the first and second workpieces 114 and 116. As the first and second workpieces 114 and 116 are engaged to one another and are moved relative to one another (i.e., slide relative to one another) during the superfinishing operation, the rubbing of the first and second workpieces 114 and 116 against one another will wipe away parts of the conversion coating from peaks on the surfaces of the first and second workpieces 114 and 116, thereby reducing the relative height of the peaks. Continued exposure of the first and second workpieces 114 and 116 to the fluid will permit the exposed portions (on the peaks) of the first and second workpieces 114 and 116 to interact with the fluid and (re) form the conversion coating. The repeated formation and removal of the conversion coating over the peaks or high spots on the first and second workpieces will eventually remove sufficient material from the engaging surfaces of the first and second workpieces 114 and 116 to reduce the surface roughness of these surfaces, as well as improve the degree or level of conformity between these surfaces, and thereby form the first and second components 14 and 16 (FIG. 1). One suitable supplier for such a fluid is REM Surface Engineering of Southington, Connecticut.

Electropolishing could employ an electrolyte fluid on/between the engaging surfaces of the first and second workpieces 114 and 116 and the provision of electric energy to the first and second workpieces 114 and 116 that permits one of the first and second workpieces 114 and 116 to function as an anode and the other one of the first and second workpieces 114 and 116 to function as a cathode. Contact between the peaks or high spots on the first and second workpieces 114 and 116 while the first and second workpieces 114 and 116 are moved (slid) relative to one another can cause the peaks or high spots to dissolve in the electrolyte fluid at a relative faster rate than the portions of the surfaces of the first and second workpieces 114 and 116 that surround the peaks or high spots to reduce the surface roughness of these surfaces and improve the degree or level of conformity between these surfaces and thereby form the first and second components 14 and 16 (FIG. 1).

Chemically-accelerated surface finishing with tribochemical film deposition could employ a coating fluid on/between the engaging surfaces of the first and second workpieces 114 and 116. The engaging surfaces of the first and second workpieces 114 and 116 can act as burnishing tools against one another to thereby reduce the surface roughness of these surfaces and improve the degree or level of conformity between these surfaces, as well as apply pressure on the fluid on the engaging surfaces that causes the fluid to convert to a coating having desired friction characteristics to thereby form the first and second components 14 and 16 (FIG. 1). One suitable supplier for such a fluid is Applied Nano Surfaces AB of Uppsala, Sweden The superfinishing operation "finishes" the surfaces the portions of the first and second workpieces 114 and 116 that engage (slide on) one another to thereby form the first and second components 14 and 16 (FIG. 1). The first and second components 14 and 16 (FIG. 1) can be removed from the superfinishing machine 120 as a matched set.

With reference to FIGS. 1 and 2, the method can proceed to block 56 where as a matched set the first and second components 14 and 16 can be engaged to one another and mounted in the housing 12 for movement relative to one another in a predetermined manner. As described above, the pinion gear or first component 14 can be mounted to the housing 12 for rotation about the first axis 20 and the ring gear or second component 16 can be meshed with the input pinion 14 and mounted to the housing 12 for rotation about the second axis 30.

While the first and second components 14 and 16 have been illustrated and described as being rotatable about two transverse axes, it will be appreciated that the first and second axes 20 and 30 could be configured in a different manner, and could intersect one another or could be parallel to one another. Moreover, the first and second components 14 and 16 need not have teeth that meshingly engage one another but rather could have surfaces that engage one another in another manner, such as rolling contact. Furthermore, movement of the first and second workpieces relative to one another in the predetermined manner can comprise translating one of the first and second workpieces along an axis of the other one of the first and second workpieces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming an assembly having a housing and first and second components, the first and second components being movable relative to one another in the housing, the method comprising:
    mounting a first workpiece for rotation about a first axis;
    mounting a second workpiece in meshing engagement with the first workpiece and for rotation about a second axis;
    rotating the first workpiece about the first axis to drive the second workpiece about the second axis to produce relative sliding motion between the first and second workpieces;
    performing a superfinishing operation on the first and second workpieces during the production of relative sliding motion between the first and second workpieces to form the first and second components, respectively, wherein the superfinishing operation does not comprise a lapping operation; and
    mounting the first and second components in the housing such that the first and second components are meshingly engaged to one another and are rotatable relative to the housing about the first and second axes, respectively;
    wherein a non-abrasive fluid is employed in the superfinishing operation; and
    wherein the superfinishing operation comprises chemical polishing, electro-polishing, chemically-accelerated surface finishing with tribochemical film deposition and combinations thereof.

2. The method of claim 1, wherein one of the first and second components is a ring gear and the other one of the first and second components is a pinion gear.

3. The method of claim 2, wherein the ring gear and the pinion gear are spiral bevel gears.

4. The method of claim 2, wherein the assembly is a power take-off unit or an axle assembly.

* * * * *